(12) United States Patent
Dahl

(10) Patent No.: US 12,286,247 B1
(45) Date of Patent: Apr. 29, 2025

(54) HIGH GAIN ANTENNA GIMBAL DISTURBANCE TORQUE ESTIMATION AND REJECTION SYSTEMS AND METHODS

(71) Applicant: BAE Systems Space & Mission Systems Inc., Broomfield, CO (US)

(72) Inventor: Lydia Salazar Dahl, Lafayette, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 425 days.

(21) Appl. No.: 17/396,010

(22) Filed: Aug. 6, 2021

Related U.S. Application Data

(60) Provisional application No. 63/064,717, filed on Aug. 12, 2020.

(51) Int. Cl.
*B64G 1/66* (2006.01)
*B64G 1/24* (2006.01)

(52) U.S. Cl.
CPC ............... *B64G 1/66* (2013.01); *B64G 1/24* (2013.01); *B64G 1/245* (2023.08)

(58) Field of Classification Search
CPC ............ B64G 1/66; B64G 1/24; B64G 1/245
See application file for complete search history.

(56) References Cited

U.S. PATENT DOCUMENTS

| 6,000,661 | A | * | 12/1999 | Price | B64G 1/285 |
| | | | | | 701/13 |
| 2009/0012662 | A1 | * | 1/2009 | Liu | B64G 1/244 |
| | | | | | 701/13 |
| 2018/0135798 | A1 | * | 5/2018 | Griffin | G05B 6/02 |
| 2019/0064364 | A1 | * | 2/2019 | Boysel | G05D 1/0231 |
| 2020/0003357 | A1 | * | 1/2020 | Su | F16M 11/18 |

\* cited by examiner

*Primary Examiner* — Ig T An
(74) *Attorney, Agent, or Firm* — Sheridan Ross P.C.

(57) ABSTRACT

Systems and methods for pointing a high gain antenna or other directional instrument connected to a platform by a gimbal are provided. A control system as disclosed can include a flight computer having a processor for executing software and a motor control board having a controller for implementing at least portions of a control algorithm. The software executed by the processor generates pointing commands and implements a Kalman filter included in a feedback loop in the form of a linear Kalman filter disturbance estimator of the control algorithm implemented by the controller. The control algorithm can further implement a proportional control position loop and a proportional control rate loop. Each axis of the gimbal is provided with an instance of the control algorithm and the Kalman filter. Moreover, the processor can be operated at a rate that is less than a rate at which the controller is operated.

20 Claims, 4 Drawing Sheets

HIGH GAIN ANTENNA GIMBAL DISTURBANCE TORQUE ESTIMATION AND REJECTION SYSTEMS AND METHODS

CROSS-REFERENCE TO RELATED APPLICATIONS

This application claims the benefit of U.S. Provisional Patent Application Ser. No. 63/064,717, filed Aug. 12, 2020, the entire disclosure of which is hereby incorporated herein by reference.

FIELD

Control systems and methods for controlling the position of gimbaled systems, including the pointing of gimbaled high gain antennas, are provided.

BACKGROUND

Wireless communication, radar, or other radio frequency (RF) type systems often feature an antenna that is physically pointed in order to maximize the gain of signals passed to or from another endpoint, a target, or a target area. As an example, communications between a first endpoint in the form of a satellite orbiting the earth and another endpoint, such as an earth based station, another satellite, or a spacecraft are often conducted using a communication system that includes a dish or other directional type antenna, referred to herein as a high gain antenna (HGA). In order to maximize the gain of the signals at the endpoints, it is necessary to point the communication antenna carried by the satellite at the other endpoint, even as the endpoints are moving relative to one another. As it can be impractical or impossible to move the satellite bus or body itself simply to point the communications antenna, the antenna is often mounted to the satellite via a mechanism, referred to as a gimbal, that allows movement of the antenna relative to the satellite body about one or more axes. Movement of the antenna supported by the gimbal is typically performed by operating electric motors or actuators in response to commands provided by a controller.

The controller is implemented as a control system. In simple configurations, control systems can include proportional (P), proportional-integral (PI), and proportional-integral-derivative (PID) controllers. These controllers can be implemented in mechanical, analog electronic, or digital electronic forms. Mechanical control systems are typically limited to relatively simple mechanical systems. Therefore, for controlling systems involving electrical sensors or actuators, particularly in aerospace applications, electronic controllers are typically employed. In addition, electronic control systems lend themselves to applications that require tracking different endpoints or objects in different locations relative to the satellite carrying the antenna being pointed by the control system.

In at least some electronic control systems, an approximation of the expected spacecraft disturbance torques on the HGA gimbal resulting from planned operational bus motion is calculated. This is done using a dynamic prediction equation based on the inertias, mass, angular rates, and lever arms of the spacecraft center of gravity (CG) to the center of rotation (CR) of the two HGA gimbals. This calculation is made in an open loop fashion and feed forward signals are provided to the gimbal control loop to try to cancel the disturbances. This approach attempts to estimate disturbances analytically, but without feedback measurements. This requires an accurate estimate of mass, inertia, bus rate and acceleration and geometry of the spacecraft center of gravity to gimbal axes center of rotations. These parameters are constantly changing and are not accurately known. An approximation can be made by the following equation:

$$I_B \dot{\bar{\omega}}_B \approx -I_U \dot{\bar{\omega}}_U - I_L \dot{\bar{\omega}}_L - \frac{1}{M_U + M_L + M_B}[(M_L M_B \bar{x}_{LB} \times \ddot{\bar{x}}_{LB}) + (M_U M_B \bar{x}_{UB} \times \ddot{\bar{x}}_{UB}) + (M_L M_U)(\bar{x}_{UB} - \bar{x}_{LB}) \times (\ddot{\bar{x}}_{UB} - \ddot{\bar{x}}_{LB})]$$

where
- I denotes inertia,
- M denotes mass,
- $\bar{\omega}$ denotes angular rate
- the subscripts B, U, L denote the spacecraft body, upper gimbal, and lower gimbal, respectively
- $x_{LB}$ is the vector from the spacecraft body CG to the lower gimbal CR,
- $x_{UB}$ is the vector from the spacecraft body CG to the upper gimbal CR.

Depending on the architecture and communication interface between the spacecraft bus and HGA payload, this method may not even be possible. The communication messages from the bus to the payload would require that bus rate and accelerations be available. Often accelerations from the bus are not available and this would then require an additional observer or estimator on the bus to generate acceleration predictions.

In other control systems, a control loop provides unknown disturbance rejection using an integrator in an inner rate control loop. However, there is a penalty for using an integrator in the controller architecture. An integrator's placement is limited by the structural modes of the system and the cost associated for using it is a decrease in stability margins. In addition, if the bandwidth of the controllers for the various HGA gimbal axes are limited, for example, due to a bus solar array mode, or HGA boom mode, the integrator's effectiveness is limited in rejecting disturbances. Although a control system incorporating an integrator provides only limited disturbance rejection, it is the most widely used method for effecting control of a HGA.

Accordingly, it would be desirable to provide control systems and methods that provided superior disturbance rejection with a small pointing error.

SUMMARY

In accordance with embodiments of the present disclosure, control systems and methods for a gimballed component are provided. A system as disclosed herein generally includes a platform, and a component interconnected to the platform by a gimbal. In accordance with at least some embodiments of the present disclosure, the platform is a satellite, and the component interconnected to the platform by the gimbal is a high gain antenna. The system also generally includes control electronics that control the operation of one or more actuators that are operable to move the HGA about the axis or axes of the gimbal. The control electronics can implement a control procedure that places a Kalman filter in a feedback loop. In accordance with embodiments of the present disclosure, the control electronics can include a processor for performing various functions, and a controller for performing various other functions. Although in at least some applications, the gimballed component is a high gain antenna carried by a satellite in earth orbit, other applications are within the scope of the present disclosure.

A method as disclosed herein generally provides for the control of a component interconnected to a platform by a gimbal. The method includes determining a desired pointing of the component. An actuation or pointing command is then provided to one or more actuators to move the component relative to the platform. The actuation command signal and a signal indicating a difference between the desired position and the actual position of the component are provided as first and second inputs to a Kalman filter. The output of the filter is then provided as a feedback signal indicating an estimate of the net disturbance experienced by the gimbal. This estimated net disturbance is then subtracted from a next actuation command.

Additional features and advantages of embodiments of the disclosed antenna systems and methods will become more readily apparent from the following description, particularly when taken together with the accompanying drawings.

DETAILED DESCRIPTION

Figure 1:
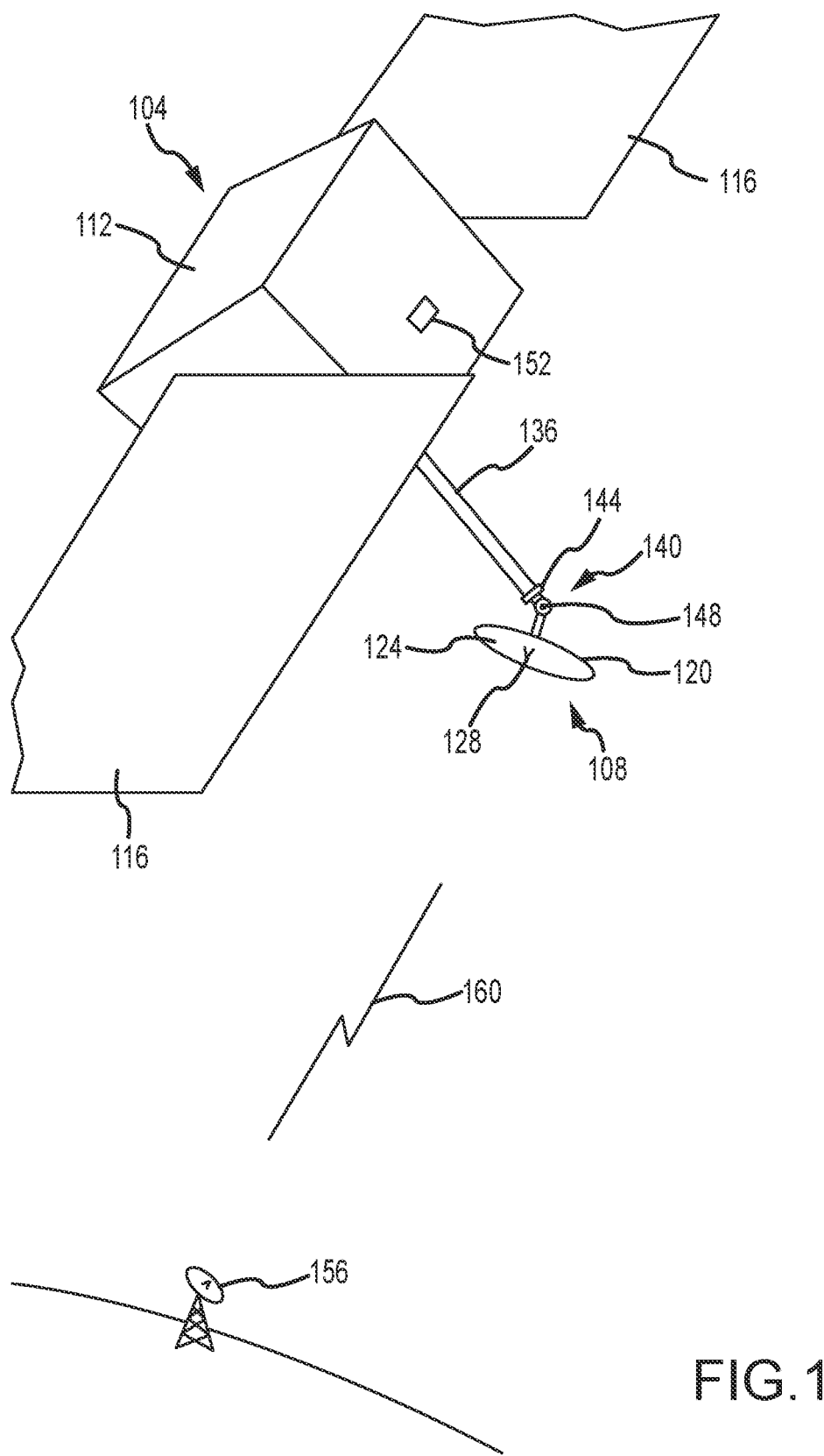
FIG. 1 depicts a high gain antenna arrangement on a boom attached to a spacecraft incorporating a control system in accordance with embodiments of the present disclosure.

FIG. 1 depicts a spacecraft or satellite 104 carrying a high gain antenna (HGA) system 108 and incorporating a control system implemented by control electronics in accordance with embodiments of the present disclosure. The satellite 104 generally includes a bus or main structure 112 and one or more solar panels 116, in addition to the HGA system 108. As shown in this example, the HGA system 108 can feature a high gain antenna element 120, which can include a reflector or dish 124 and a feed element 128. In the illustrated example, the HGA element 120 is connected to a boom 136 extending from the satellite bus 112 by a multiple axis (e.g. a 2-axis) gimbal 140. The example gimbal 140 includes a first pivot assembly 144 that allows rotation of the HGA system 108 about an axis that is generally coincident with a longitudinal axis of the boom 136, and a second pivot assembly 148 allows the HGA system 108 to be rotated about a second axis that is perpendicular to the first axis. For example, the gimbal 140 can allow the HGA system 108 to rotate about elevation and azimuth axes.

Control electronics 152 for effecting desired HGA element 120 pointing operations are mounted on or in the spacecraft 104 bus 112. As discussed in greater detail herein, the control electronics 152 can include various components that implement a control system as described herein for controlling the pointing of the HGA element 120 of the HGA system 108 along a desired line of sight. For example, as depicted in the figure, the HGA element 120 can be pointed at a ground station 156 to support a radio frequency (RF) communication channel 160 between that ground station 156 and the satellite 104. In addition to maintaining the pointing of the HGA element 120 along a selected line of sight, the HGA system 108 can operate to move the HGA element 120 such that it is pointed along different lines of sight encompassing different communication endpoints or targets as desired. The pointing of the HGA element 120 towards those different lines of sight can then be maintained as desired or required to complete selected operations.

As can be appreciated by one of skill in the art, accurate pointing of the HGA element 120 is often complicated by the presence of vibrations, resonances, or other characteristics of the satellite 104, in addition to the difficulty of simply pointing an HGA element 120 having a relatively narrow beam so that it encompasses a desired endpoint. For example, in this HGA system 108 scenario, the disturbance torques are significant due to the normal and tangential acceleration imparted onto the gimbal 140 from the motion of the spacecraft 104. Typically, unknown disturbances are mitigated either with an open loop feed forward scheme or with a control system that uses integral control. Open loop feed forward algorithms are not accurate due to changing mass and geometry or the unavailability of bus dynamic knowledge. Integral control is not always effective at achieving the necessary disturbance rejection to meet stringent requirements. For instance, bandwidth and margins may be limited by structural modes. The disturbances may be so large that the placement of the integral control cannot meet control error requirements while maintaining adequate stability margins. In accordance with embodiments of the present disclosure, a state estimator is implemented in the control electronics 152 to estimate the disturbance torque. That estimate is then used to feed forward a command torque to cancel the disturbance. This method provides disturbance rejection without the penalty of phase margin loss. This method can also provide a more accurate disturbance rejection than prior techniques. In addition to accurately estimating dynamic disturbances, the HGA system 108 friction can also be estimated and corrected for within the same algorithm. Accordingly, embodiments of the present disclosure facilitate the accurate pointing of a HGA element 120 even in dynamic systems.

Figure 2:
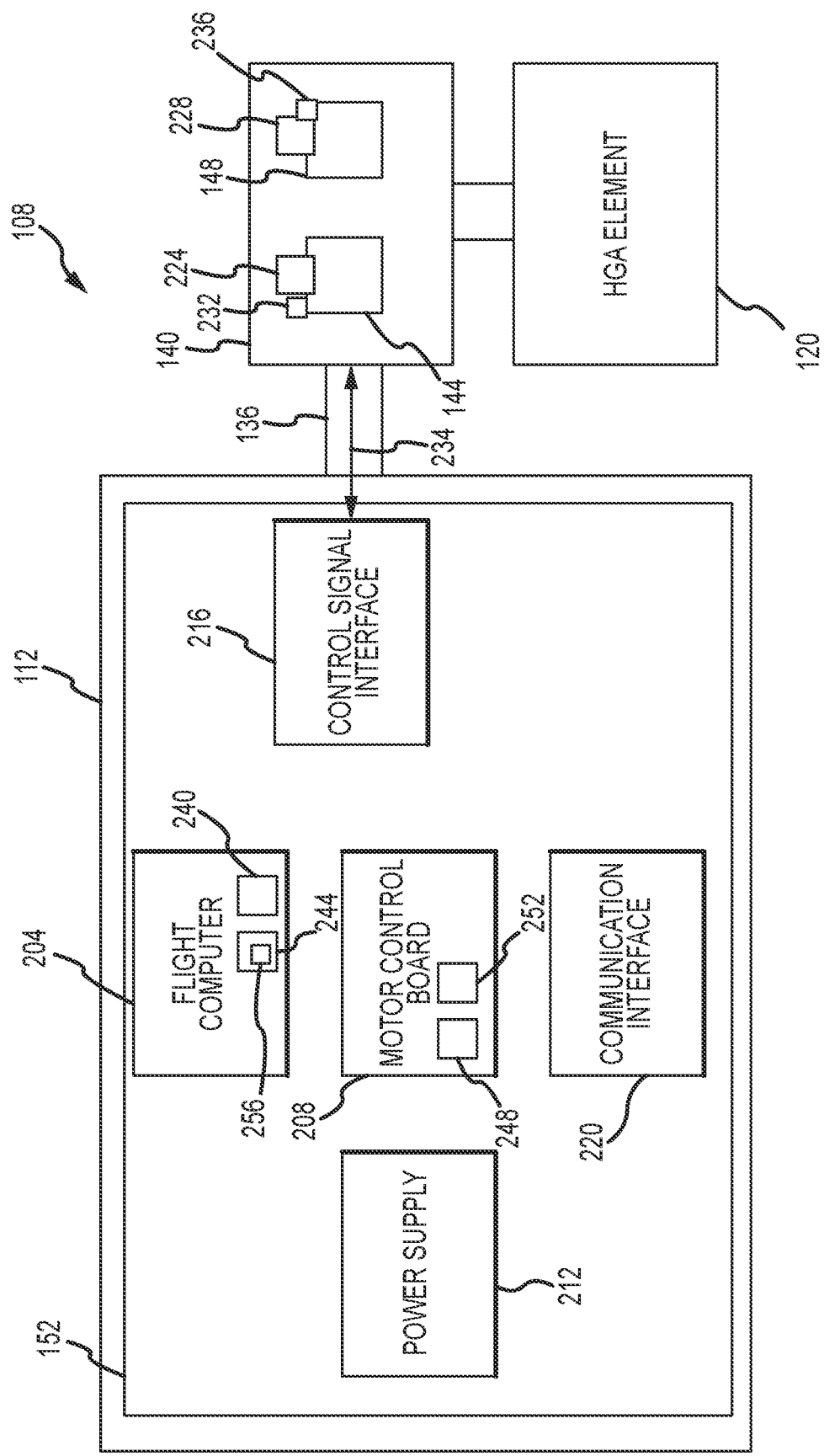
FIG. 2 depicts components of a high gain antenna system in accordance with embodiments of the present disclosure.

FIG. 2 depicts components of an HGA system 108 in accordance with embodiments of the present disclosure in block diagram form. As previously discussed, the HGA system generally includes an HGA element 120, a gimbal 140, a boom 136, and control electronics 152. As shown, the control electronics 152 can be disposed on or within the spacecraft bus 112. The boom 136 connects the gimbal 140 and HGA element 120 to the spacecraft bus 112. In addition, signal lines 234 extend along or within the boom 136, to operatively connect the control electronics 152 to components supported by the boom 136.

The HGA element 120 can include any type of directional antenna or other device that requires accurate pointing for optimal operation. For example, but without limitation, the HGA element 120 can include any type of directional antenna element. For example, the HGA element 120 can include a dish, horn, or other type of antenna element. As depicted in FIG. 1, the HGA element 120 can include a reflector 124 and a feed structure 128. In addition or as an alternative to communications with a ground station 156, the HGA system 108 can be operated in connection with transmitting signals to and/or receiving signals from an object or system mounted to a vehicle or to a platform other than a ground station 156.

The gimbal 140 connects the HGA element 120 to the spacecraft bus 112 via the boom 136, while allowing the HGA element 120 to be moved about at least one axis relative to the spacecraft bus 112 in order to maintain contact with the ground station 156 or other target. As an example, but without limitation, the gimbal 140 can be a two-axis gimbal that includes a first pivot assembly 144 that allows for rotation about a first axis and a second pivot assembly 148 that allows for rotation about a second axis. In at least some embodiments, the first axis is perpendicular to the second axis. In addition to the pivot assemblies 144 and 148, the gimbal 140 can include or can be associated with a plurality of actuators, with at least one actuator associated with each pivot assembly. Accordingly, in the illustrated example HGA system 108 includes a first actuator 224 associated with the first pivot assembly 144 and a second actuator 228 associated with the second pivot assembly 148. As examples, but without limitation, the actuators 224 and 228 are motors that operate to move the HGA element 120 about the first and second pivot assemblies 144 and 148 respectively, in response to control signals from the control electronics 152. The gimbal 140 can also include or be associated with a plurality of position sensors or resolvers. In the illustrated example HGA system, first 232 and second 236 position sensors are provided. The position sensors 232 and 236 can be integrated with or attached to the respective first 144 and second 148 pivot assemblies or the respective first 224 and second 228 actuators. The position sensors 232 and 236 generally operate to provide an actual position of the pivot assemblies 144 and 148 and thus of the HGA element 120, at least relative to an end of the boom 136. Moreover, the position sensors 232 and 236 provide a feedback signal to the control loop implemented within the control electronics 152 indicating a position of the gimbal 140 axes, which can be used to derive the inertial pointing of the HGA 120.

The control electronics 152 in accordance with at least some embodiments of the present disclosure include a flight computer 204, a motor control board 208, a power supply 212, a control signal interface 216, and a communication interface 220. The flight computer 204 can be implemented as a single board controller or computer, and can include a general purpose programmable processor 240, memory 244, and various support circuits and components. The motor control board 208 can include a controller or field programmable gate array (FPGA) 248, a control signal amplifier 252, and various support circuits and components.

The control electronics 152 interface to the spacecraft 104 for transfer of digital commands and telemetry as well as receiving bus position, rate and attitude information to generate pointing for the HGA element 120, which may be expressed as a position of the gimbal pivot assemblies 144 and 148. The control electronics 152 also receive gimbal 140 telemetry, for example in the form of position signals from the position sensors 232 and 236, in order to close the control loop. In accordance with at least some embodiments of the present disclosure, the control electronics 152 control the two axis gimbal 140 using a combination of algorithms running on the flight computer 204 and the motor control board 208. For example, flight computer 204 pointing and determination software 256 can be stored in the memory 244 and executed by the processor 240. In general, the pointing and determination software 256 generates pointing commands from position and attitude information from the spacecraft 104. These pointing commands are sent to the motor control board 208. The FPGA 248 can include firmware or can otherwise be programmed to implement a control loop, which creates actuation commands in response to the pointing commands received from the single board controller 204. The actuation commands can be amplified by the control signal amplifier 252, provided to the control signal interface 216, and then passed along the signal lines 234 to one or both of the actuators 224 and 228. Accordingly, the control signal interface 216 generally provides control actuator signals to the gimbal 140. In addition, the control signal interface 216 passes measured resolver or position sensor 232 and 236 signals to the motor control board 208.

As can be appreciated by one of skill in the art after consideration of the present disclosure, the control electronics 152 operate to initiate and maintain accurate pointing of the HGA element 120, for example to support the transmission of communication and data signals between the spacecraft 104 and ground station. In accordance with embodiments of the present disclosure, the pointing and determination software 256 executed by the flight computer 204 can implement pointing determination algorithms that receive spacecraft 104 attitude and ephemeris data and, together with ground station 156 location, determines the required pointing commands in the gimbal 140 coordinate frame to point the HGA element 120. The flight computer 204 processor 240 can also implement the disturbance rejection algorithm described herein, again through the execution of the pointing and determination software 256. The commands that are sent to the motor control board 208 FPGA 248 can include position, rate, acceleration and torque commands for each gimbal 140 axis.

The motor control board 208 receives the commands generated by the pointing determination software 256 running on the flight computer 204 and implements the control loops to control the gimbal 140. Moreover, as an example but without limitation, the motor control board 208 FPGA 248 can implement one or more configurable controllers that include a proportional control position loop, a proportional rate loop, notch filters, adaptive gain scheduling, and other filtering. The FPGA 248 also provides telemetry of the controller loop back to the flight computer 204 for fault management and for disturbance torque estimation.

The communication interface 220 connects the control electronics 152 to other components, devices, or systems on the spacecraft 104, and can therefore provide physical connections and associated software drivers to one or more networks, busses, point-to-point connections, or the like.

Figure 3:
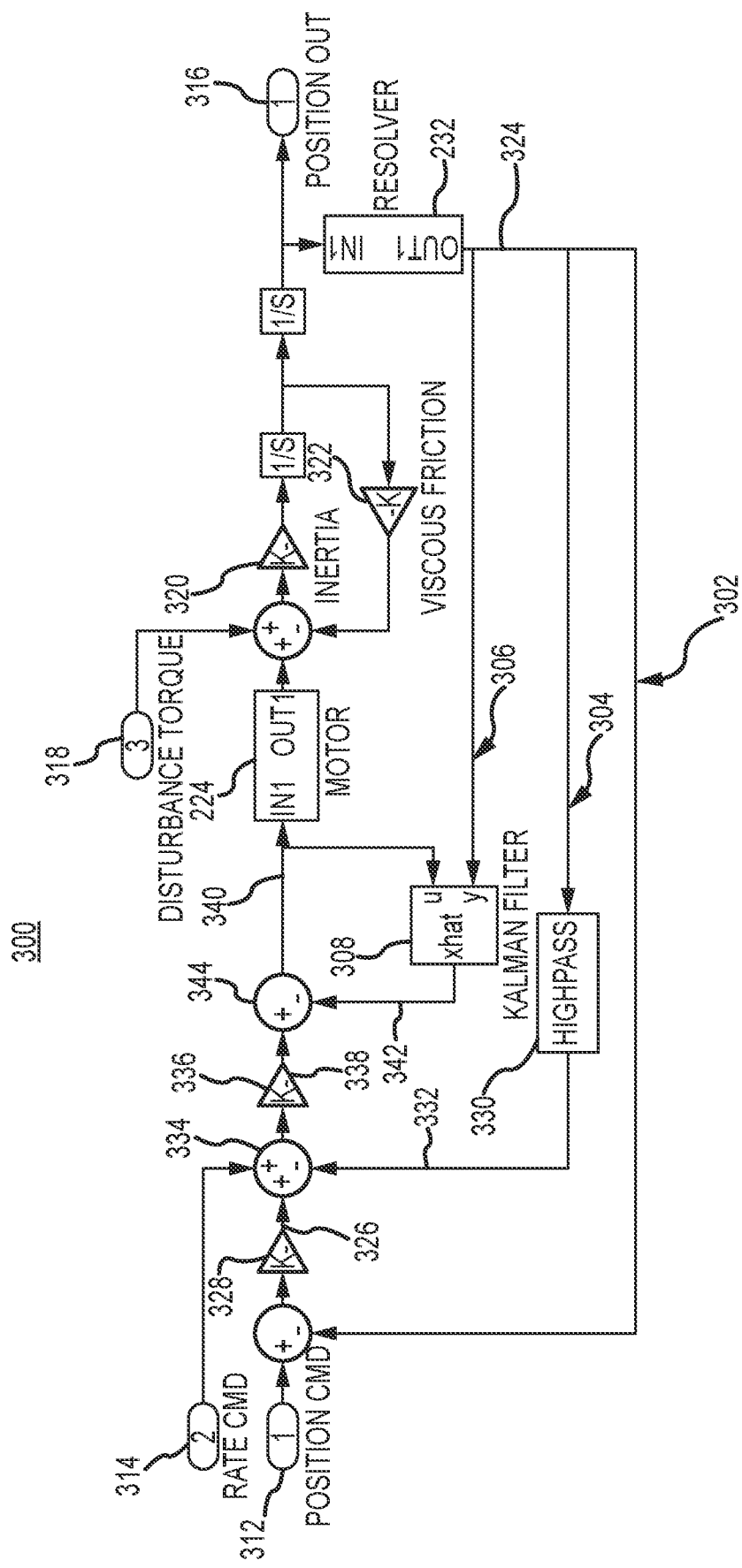
FIG. 3 depicts the architecture of a control system in accordance with embodiments of the present disclosure.
Figure 4:
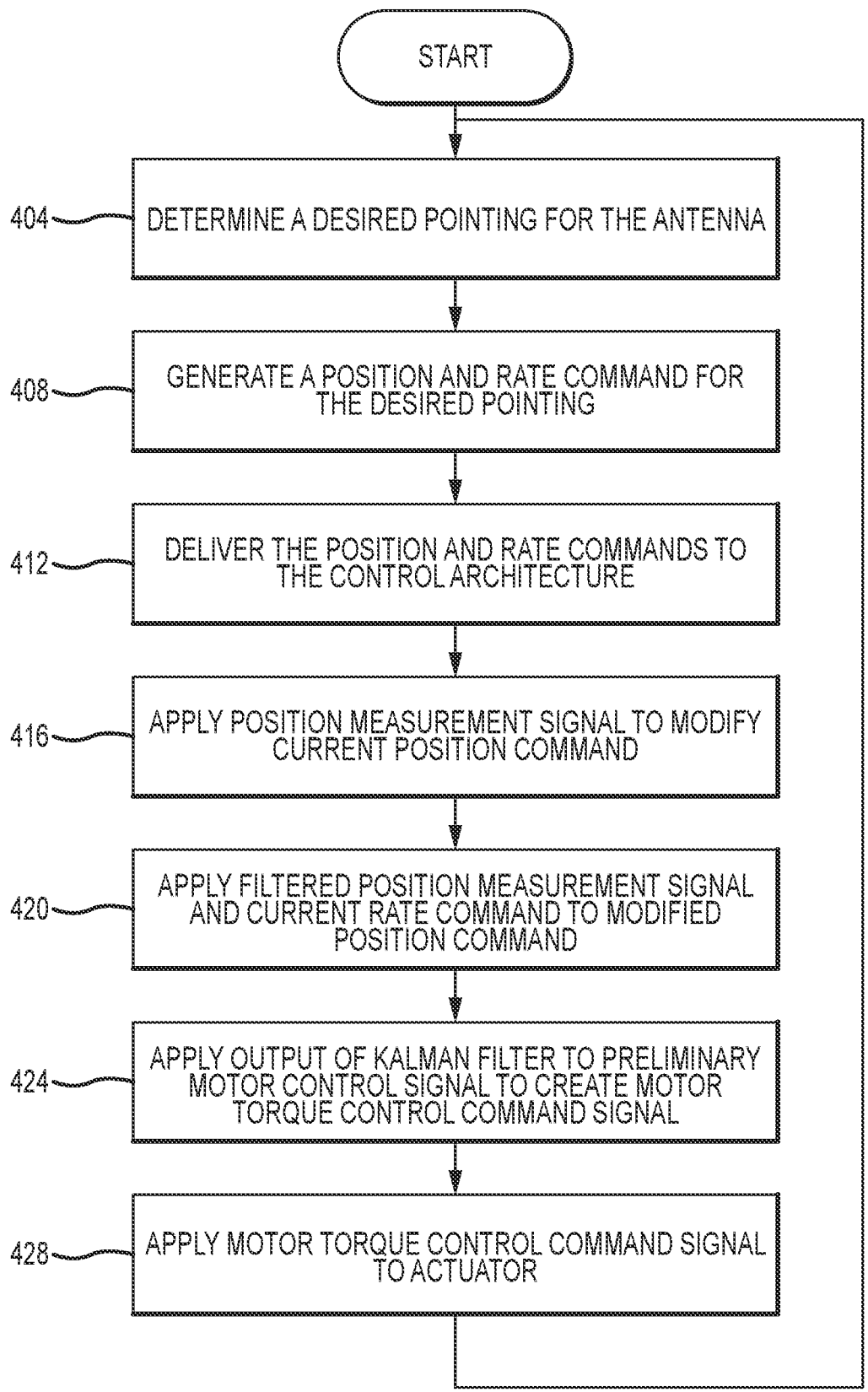
FIG. 4 is a flowchart depicting aspects of a method for pointing an antenna in accordance with embodiments of the present disclosure.

FIG. 3 depicts the architecture of a control algorithm, also referred to herein as the control architecture or control system 300, that resides on the flight processor 204 and motor control board 208 of the control electronics 152 in accordance with embodiments of the present disclosure. More particularly, elements of a control architecture or control system 300 for an exemplary single axis of the gimbal 140 is shown in FIG. 3. It includes a proportional control position loop 302, a proportional control rate loop 304, and a linear Kalman filter disturbance estimator 306. In an exemplary embodiment, the gimbal 140 commands are processed in the flight processor running at 100 Hz. This includes the Kalman filter 308. The controller functions are performed in the FPGA 248 on the motor control board 208 running at 1 KHz. In embodiments of the present disclosure implementing a multiple axis gimbal 140, the basic control architecture 300 is duplicated for each axis. Moreover, the control architecture for each of the axes can be implemented by the same or a different processor 240 and the same or a different controller 248.

More particularly, a pointing or position command 312 is provided from the position determination software 256 running on the flight computer 204 processor 240 as an input. In addition, the software 256 can provide a rate command 314. The command signals 312 and 314 are passed through the control architecture 300, which modifies the initial command signals 312 and 314 as discussed herein, and provides a motor torque command signal 340 to the actuator 224 for the subject axis of the gimbal 140. As can be appreciated by one of skill in the art after consideration of the present disclosure, the actual position of the HGA element 120 achieved after the commands 312 and 314 have been modified as described herein to create the motor torque command signal 340 that is passed to the actuator 224 will be affected by various factors, such as a disturbance torque 318, inertia 320, and gimbal friction 322. The actual position of the HGA element 120 achieved as a result of the position output signal 316 is measured at the position sensor 232 for the subject axis, and provided as a position measurement 324 from the position sensor 232 for that axis.

The proportional control position loop 302 is configured as an outer control loop, and uses the position measurement signal 324 to create a modified position command signal 326. For instance, a position measurement signal 324 from the position sensor 232 for the subject axis is applied as an error signal that modifies a next position 312 command by subtracting that measurement from a next position command signal 312, and then applies a selected gain in a first proportioning block 328 to create the modified position command signal 326.

The proportional control rate loop 304 is located between the proportional control position loop 302 and the Kalman filter disturbance estimator 306. The proportional control rate loop 304 applies a filtered version of the position measurement 324 for the subject axis, and applies that filtered measurement as a feedback signal that is used to modify the next rate command 314 and the modified position command signal 326 in creating a modified next rate command preliminary motor control signal 338. For example, the position measurement 324 is fed to a high pass filter 330 implemented by the motor control board 208 FPGA 248 to create a filtered position signal 332, the filtered position signal 332 is applied to the next rate command 314 and the modified position command signal 326 at a second summing point 334, and a selected gain is then applied in a second proportioning block 336, creating a preliminary motor control signal 338.

The Kalman filter disturbance estimator 306 is configured as an inner control loop. The Kalman filter disturbance estimator 306 includes a Kalman filter 308 that receives a motor torque command signal 340 as a first input, and the position measurement signal 324 as a second input. In accordance with embodiments of the present disclosure, the Kalman filter 308 is implemented in the pointing and determination software 256 running on the flight computer 204 processor 240. The output 342 from the Kalman filter 308 is provided as an estimate of the net disturbance that the gimbal 140 sees. This estimate is applied to modify the preliminary motor torque command signal 338. For example, the output 342 from the Kalman filter 308 can be subtracted from the preliminary motor torque command signal 338 at summing block 344 to create the motor torque command signal 340 that is passed to the actuator 224 for the subject axes. Accordingly, embodiments of the present disclosure provide information regarding the command output 342, in addition to information regarding the actual Kalman Filter inputs, position as measured at the gimbal 124 axis, and commanded torque to the motors 340, to the Kalman filter 308.

Methods in accordance with embodiments of the present disclosure include providing a Kalman filter disturbance estimator in the generation of a motor torque command signal 340. More particularly, a desired pointing for a directional instrument, such as a HGA 120, connected to a platform, such as a spacecraft or satellite 104, via a one or more axis gimbal 140, is determined (step 404). In accordance with embodiments of the present disclosure, the desired pointing may be determined in connection with the execution of pointing and determination software 256 executed by a processor 240 provided as part of a flight computer 204 included in control electronics 152 carried on board the platform 104. As an example, but without limitation, the desired pointing may be a pointing required to maintain a radio frequency (RF) communication channel 160 between the spacecraft 104 and a ground station 156 or other endpoint. The software 256 then generates a position command 312 and a rate command 314 (step 408). At step 412, the position command 312 and the rate command 314 are input to a control algorithm 300 (step 412). Where the gimbal 140 provides for motion of the HGA 120 about more than one axis, a control algorithm 300 is provided by the control electronics 152 for each axis, and separate position 312 and rate 314 command pairs are generated for each axis and provided to the respective control algorithm 300. In accordance with embodiments of the present disclosure, the control algorithm is at least in part implemented by a controller 248 provided as part of a motor control board 208 included in the control electronics 152. In accordance with other embodiments of the present disclosure, only a position command 312 is generated and provided to the control algorithm 300 for the respective gimbal 140 axis.

At step 416, the position command is modified by application of a position measurement signal 324 from a position sensor 232 associated with the subject gimbal 140 axis and by applying a selected gain. For example, the position measurement signal 324, which represents a position of the gimbal 140 pivot 144 for the subject axis as a result of a previous set of commands 312 and 314, can be subtracted from the current position command 312, and the resulting value can be multiplied by the selected gain amount to obtain a modified position command 326. Accordingly, the method can include implementing a proportional control position loop 302. Moreover, the proportional control position loop 302 can be implemented by the controller 248.

At step 420, the modified position command 326 is itself modified by application of the rate command 314, application of a filtered version 332 of the position measurement signal 324 that was applied in the previous step by the proportional control position loop 302, and by applying a selected gain. In accordance with embodiments of the present disclosure, the position measurement signal 324 is filtered by a high pass filter 330. As an example, the current rate command 314 and the modified position command 326 are added, and the filtered position measurement signal 332 is subtracted from that sum. The resulting value can then be multiplied by a selected gain amount to obtain a preliminary motor control signal 338. Accordingly, the method can include implementing a proportional control rate loop 304. In accordance with embodiments of the present disclosure, the proportional control rate loop 304, including the high pass filter 330, is implemented by the controller 248.

At step 424, the preliminary motor control signal 338 is modified by application of an output of a Kalman filter 308 to create a motor torque command signal 340. In accordance with embodiments of the present disclosure, the Kalman filter 308 has a first input in the form of a motor torque command signal generated as a result of a previous set of commands 312 and 314, and the position measurement signal 324 that was applied in the previous steps by the proportional control position loop 302 and (in filtered form) by the proportional rate control loop 304. Accordingly, the method can include implementing a Kalman filter disturbance estimator 306. In at least some embodiments of the present disclosure, the Kalman filter 308 is a linear Kalman filter, resulting in a linear Kalman disturbance estimator. Moreover, the Kalman filter disturbance estimator 306 can, in at least some embodiments of the present disclosure, be implemented as an inner control loop. The Kalman filter 308 can be implemented by the execution of the pointing and determination software 256, or other software specifically for implement the Kalman filter 308, by the processor 240. The portions of the Kalman filter disturbance estimator 306 other than the Kalman filter 308 itself can be implemented by the controller 248 as part of the control algorithm 300.

The motor torque control command signal 340 is then applied to the actuator 224 for the subject axis of the gimbal 140 (step 428). In general, in response to receiving the motor torque control command signal 340, the actuator 224 moves the HGA element 120 about the gimbal 140 axis controlled by the actuator 224.

The control system and Kalman Filter is continually calculating pointing commands and corrections. The Kalman Filter monitors for any disturbances such as friction or dynamic disturbances and removes them. This happens regardless of which target or ground station is being commanded. Whenever there is active control of the gimbal the Kalman Filter is augmenting the command to remove errors unless configured via an enable/disable flag in configurable constants.

Although various examples provided herein discuss a gimbaled instrument in the form of a HGA 120 carried by a satellite or spacecraft 104, it should be appreciated that embodiments of the present disclosure are not limited to such embodiments. In particular, systems and methods as discussed herein can be applied in connection with the control of any gimbaled instrument that requires accurate pointing for proper operation. Moreover, although various examples have been provided that discuss pointing a gimbaled instrument mounted to an orbiting or otherwise moving platform at a ground station 156, systems and methods as discussed herein can be applied to any operational scenario, including communications between different platforms, tracking of moving objects, or the like.

Tight requirements for pointing an HGA antenna 120 from a geosynchronous orbit require exceptional performance in the area of control error. If the control error is too large, communication of the HGA antenna 120 could be in jeopardy. The pointing budget has many contributors. Contributors include mechanical misalignments, launch shifts, calibration residual, resolver error, thermal error and bus attitude knowledge. By achieving good performance with the flight computer 204 pointing and determination software 256 implementing the Kalman filter 308, and the motor control board 208 FPGA 248 implementing various elements of the control algorithm 300, more margin is achieved and therefore a larger allocation is made available to other pointing error contributors. The Kalman filter disturbance torque estimator 306, when used in the control loop, allows near perfect controller performance. It far outperforms traditional methods.

Embodiments of the present disclosure provide a disturbance torque estimation and rejection algorithm that integrates into a standard gimbal control architecture. In accordance with at least some embodiments of the present disclosure, a specific application for this disturbance torque estimation algorithm is for a two axis gimbal that experiences large unknown disturbances such as a gimbaled high gain antenna (HGA) mounted on a boom attached to a geosynchronous spacecraft.

This approach is novel at least in part in the implementation which merges the command software 256 calculated on a processor 240 and the control firmware being calculated on a field programmable gate array (FPGA) 248. The gimbal 140 commands including the disturbance estimation feed forward command from the Kalman filter disturbance torque estimator 306 are processed in the flight computer 204 processor 240. The remaining controller functions are performed in the FPGA 248. The complete control architecture of the gimbal 140 X and Y axes consist of a configurable design with a baseline proportional control position loop 302, a proportional rate loop 304, and the linear Kalman filter 308 disturbance estimator 306.

In accordance with embodiments of the present disclosure, the flight computer 204 processor 240 calculates the gimbal 140 commands for position, rate feedforward and torque feedforward at a typical frequency of 100 Hz. The control algorithm is calculated in a standard FPGA 248 at 1 KHz. The flight computer 204 processor 240 has access to real time FPGA 248 telemetry for commanded torque, and resolver 232 position measurements. Using the command torque and resolver position information, the Kalman filter 308 provides a disturbance torque estimate at 100 Hz. This disturbance torque estimate is fed forward as a negative torque command to the FPGA 248. In this manner the disturbance torque is rejected or cancelled. In accordance with at least some embodiments of the present disclosure, the Kalman filter 308 states of position, rate and torque are estimated at the time of the resolver 232 measurements. Therefore, the estimate will be calculated for the prior command time. It was found that for this application this delay did not affect the performance, so the feed forward torque was not adjusted forward to the control tick.

In flight, the Kalman filter 308 monitors the error covariances, and residuals so that a pass/fail flag can be set. This pass/fail flag will be set to true after a configurable amount of time has passed to ensure filter convergence, and only if the error covariances and residuals are within a threshold. In addition, a configurable gain on the torque feedforward can be set to limit the amount of feed forward torque that is commanded. The FPGA 248 provides monitoring and limiting so that it is not possible to over command the gimbal 140. An enable/disable flag is also configurable to allow the Kalman filter 308 to be disabled if it is not desired to run.

For two axis gimbaled systems, the outer or Y gimbal or pivot assembly 148 inertia changes as a function of inner or X gimbal or pivot assembly 144 inertia. Therefore, the algorithm adjusts the inertia parameters as a function of resolver 232 measurement to account for parametric changes during flight. Sensitivity analysis showed that an error in inertia estimate did not affect the accuracy but affected the convergence rate of the Kalman filter 308.

In accordance with at least some embodiments of the present disclosure, there is also an input to the Kalman filter 308 which determines if the filter should be reinitialized. It may be desired to reinitialize the filter 308 to predefined initial configuration parameters for process noise, measurement noise, and error covariance if the gimbal is commanded to slew to a new ground station. However, the filter 308 will adapt without reinitialization.

A Kalman filter 308 in accordance with embodiments of the present disclosure estimates state variables by performing an a priori time update that propagates the state vector by a model of motion, and then an a posteriori measurement update that corrects the prediction by using an observation or measurement. The states for this filter 308 are gimbal angular position, angular rate, and disturbance torque. The control input for this filter 308 is the FPGA commanded torque. It is assumed that the disturbance torque is constant over the period for which it is being calculated. A higher fidelity dynamic equation for torque estimate based on gimbal mass, lever arms and bus motion could be used. However, accurate values for these parameters may not be available and add considerable complexity to the time update propagation equation. This complexity was not added as the change in disturbance torque can be approximated with process noise. Some estimate of gimbal inertia is required for the process model. Error in inertia adjusts the time constant of the filter but does not contribute to error in the solution. An estimate of friction can be provided. However, it is recommended to set this value to zero so that all disturbances including friction are estimated and feed forward to the controller for cancellation. Euler's integration is used to discretize the filter which contributes negligible error and is adequate for the purposes of feedforward. Tuning of the filter can be performed to limit the effects of parameter errors.

The following is a concise summary of the fundamental equations and variables involved in the integrated Kalman filter control architecture of embodiments of the present disclosure:

State Vector:

$$\underline{x} = (\theta, \dot{\theta}, T)^T$$

θ=angular rate
T=Disturbance Torque
θ=angular rate
T=Disturbance Torque

Equations of motion:

The equations of motion are 1) the rate of change of position equals rate, 2) the dynamic equation of motion of the gimbal, and 3) rate of change of disturbance torque equals zero. The form of the equations of motion is:

$$\dot{x} = F\underline{x} + Bu, \text{ where}$$

$$F = \begin{bmatrix} 0 & 1 & 0 \\ 0 & -Kfric/J & -1/J \\ 0 & 0 & 0 \end{bmatrix}$$

$$B = \begin{bmatrix} 0 \\ 1/J \\ 0 \end{bmatrix}$$

When implementing this in discrete form, Euler's method is used:

$$F = 1 + F * dt$$

$$B = \begin{bmatrix} 0 \\ 1/J \\ 0 \end{bmatrix} * dt$$

Where I is the identity matrix, and dt is the discrete time step=$\frac{1}{100}$ seconds. J is the inertia of the gimbal, and Kfric is the friction coefficient.

Measurement Equation:

The measurement equation is linear in the state variables. The measurement equation is simply gimbal angular position as measured by the resolver.

$$\underline{z} = H\underline{x} + v \text{ (measurement matrix)}$$

$$H = [1\ 0\ 0]$$

v=measurement noise

Standard linear Kalman filter apriori and aposteriori equations are used.

Propagation Equations:

$$\hat{\underline{x}}(k+1|k) = F\hat{\underline{x}}(k)$$

$$P(k+1|k) = FP(k|k)F^T + Q$$

$$\hat{y}(k+1|k) = H\hat{\underline{x}}(k+1|k)$$

$$K(k+1) = P(k+1|k)H^T(k+1)[H(k+1)P(k+1|k)H^T(k+1) + R(k+1)]^{-1}$$

$$P(k+1|k+1) = [I - K(k+1)H(k+1)]P(k+1|k)$$

$$\hat{\underline{x}}(k+1|k+1) = \hat{\underline{x}}(k+1|k) + K(k+1)[z(k+1) - \hat{y}(k+1|k)]$$

where R is the measurement covariance matrix. Q is the process noise covariance matrix and P is the error covariance matrix. $\underline{g}$ is the state estimate, f is the measurement, F is the state transition model, H is the observation model matrix, K is the Kalman gain, and k represents the time step. k+1|k represents the time update, k+1|k+1 represents the measurement update.

The Kalman filter 308 is initialized to zero position, rate and disturbance torque. Therefore, there will be some initial transient in the state estimate.

The above description is of a standard linear Kalman filter formulation. Adding it in the controller architecture 300 and combining a digital flight processor 240 running at 100 Hz with a FPGA 252 running at 1 kHz is an aspect of the novelty of this approach. In addition, its integration into the control loop provides superior disturbance rejection over other methods and provides very small control error. This small control error provides large margin in the pointing error budget.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A system, comprising:
a spacecraft, the spacecraft including a spacecraft bus;
a control system carried by the spacecraft, including:
a flight computer, the flight computer including a processor; and
a motor control board, the motor control board including a controller;
a gimbal, including:
at least a first axis;
a first actuator for the first axis; and
a first position sensor for the first axis; and
an antenna element, wherein the antenna element is connected to the spacecraft by the gimbal,
wherein the controller implements a first control algorithm for control of the first actuator that produces a preliminary motor torque command signal for the first actuator,
wherein the first control algorithm generates a motor torque command signal that is based on the preliminary motor torque command signal for the first actuator and that is provided to the first actuator,
wherein the first control algorithm includes at least some portions of a first linear Kalman filter disturbance estimator,
wherein the processor executes software to implement a first linear Kalman filter that is included in the first linear Kalman filter disturbance estimator,
wherein the first linear Kalman filter receives the motor torque command signal that is provided to the first actuator as a first input to the first linear Kalman filter,
wherein the first linear Kalman filter receives a feedback signal from the first position sensor as a second input to the first linear Kalman filter, and
wherein an output of the first linear Kalman filter is applied to modify the preliminary motor torque command signal for the first actuator.

2. The system of claim 1, wherein the feedback signal received by the first linear Kalman filter from the first position sensor is a position measurement, and
wherein a next preliminary motor torque command signal for the first actuator is modified based on an output from the first linear Kalman filter.

3. The system of claim 2, wherein the first control algorithm further includes a first proportional control position loop and a first proportional control rate loop.

4. The system of claim 3, wherein the first proportional control position loop receives the position measurement from the first position sensor as an input,
wherein the first proportional control rate loop receives the position measurement from the first position sensor as an input, and
wherein the first proportional control rate loop includes a high pass filter implemented by the controller.

5. The system of claim 4, wherein the first control algorithm is operable to generate the preliminary motor torque command signal for the first actuator based on at least a position command for the first actuator and a rate command for the first actuator, and
wherein the execution of the software by the processor generates the position command for the first actuator.

6. The system of claim 1, wherein the gimbal includes a second axis, the gimbal further including:
a second actuator for the second axis; and
a second position sensor for the second axis,
wherein the controller implements a second control algorithm for control of the second actuator that produces a preliminary motor torque command signal for the second actuator,
wherein the second control algorithm generates a motor torque command signal that is based on the preliminary motor torque command signal for the second actuator and that is provided to the second actuator,
wherein the second control algorithm includes at least some portions of a second linear Kalman filter disturbance estimator,
wherein the processor executes software to implement a second linear Kalman filter that is included in the second linear Kalman filter disturbance estimator,
wherein the second linear Kalman filter receives the motor torque command signal that is provided to the second actuator as a first input to the second linear Kalman filter,
wherein the second linear Kalman filter receives a feedback signal from the second position sensor as a second input to the second linear Kalman filter, and
wherein an output of the second linear Kalman filter is applied to modify the preliminary motor torque command signal for the second actuator.

7. The system of claim 4, wherein the gimbal includes a second axis, the gimbal further including:
a second actuator for the second axis; and
a second position sensor for the second axis,
wherein the controller implements a second control algorithm for control of the second actuator that produces a second preliminary motor torque command signal for the second actuator,
wherein the second control algorithm generates a motor torque command signal that is based on the preliminary motor torque command signal for the second actuator and that is provided to the second actuator;
wherein the second control algorithm includes at least some portions of a second linear Kalman filter disturbance estimator,
wherein the processor executes software to implement a second linear Kalman filter that is included in the second linear Kalman filter disturbance estimator,
wherein the second linear Kalman filter receives the motor torque command signal that is provided to the second actuator as a first input to the second linear Kalman filter,
wherein the second linear Kalman filter receives a feedback signal from the second position sensor as a second input to the second linear Kalman filter,
wherein a next preliminary motor torque command signal for the second actuator is modified based on an output from the second linear Kalman filter,
wherein the second control algorithm further includes a second proportional control position loop and a second proportional control rate loop,
wherein the second proportional control position loop receives the position measurement from the second position sensor as an input,
wherein the second proportional control rate loop receives the position measurement from the second position sensor as an input, and
wherein the second proportional control rate loop includes a high pass filter implemented by the controller.

8. The system of claim 1, wherein the first control algorithm is operable to generate the motor torque command signal for the first actuator based in part on a position command for the first actuator, and
wherein the execution of the software by the processor generates the position command for the first actuator.

9. The system of claim 1, further including:
a boom, wherein the gimbal is connected to the spacecraft bus by the boom.

10. The system of claim 1, wherein the processor runs at a first rate, wherein the controller runs at a second rate, wherein the processor is a programmable processor, and wherein the controller is a field programmable gate array (FPGA).

11. The system of claim 10, wherein the first rate is less than the second rate.

12. The system of claim 10, wherein the second rate is at least ten times greater than the first rate.

13. The system of claim 1, wherein the antenna element is a directional antenna element, and wherein the antenna element is operable to transmit and receive radio frequency communication signals.

14. The system of claim 1, wherein the spacecraft is a satellite.

15. A method for controlling pointing of a directional instrument, comprising:
generating a first position command for a first actuator in software executed by a processor included in control electronics, wherein the first actuator is operable to move a first pivot assembly of a gimbal supporting the directional instrument about a first axis of the gimbal;
implementing at least portions of a first control algorithm in a controller of a motor control board included in the control electronics, wherein the first control algorithm includes at least a portion of a first linear Kalman filter disturbance estimator, and wherein a first Kalman filter included in the first linear Kalman filter disturbance estimator is implemented by the execution of the software by the processor;
providing the first position command for the first actuator from the processor included in the control electronics to the first control algorithm;
in response to the first position command for the first actuator, generating a first preliminary motor torque command signal for the first actuator by the first control algorithm;
generating a first motor torque command signal for the first actuator by the first control algorithm, wherein the first motor torque command signal for the first actuator is based on the first preliminary motor torque command signal for the first actuator;
providing the first motor torque command signal for the first actuator to the first actuator, wherein the directional instrument is moved about the first axis of the gimbal in response to the first motor torque command signal for the first actuator;
providing the first motor torque command signal for the first actuator as a first input to the first Kalman filter and providing a first position measurement from a first position sensor associated with the first axis of the gimbal as a second input to the first Kalman filter, wherein the first position measurement from the first position sensor is taken after moving the directional instrument about the first axis of the gimbal in response to the first motor torque command signal for the first actuator;
providing a second position command for the first actuator from the processor included in the control electronics to the first control algorithm;
in response to the second position command for the first actuator generating a second preliminary motor torque command signal for the first actuator by the first control algorithm;
generating a second motor torque command signal for the first actuator by the first control algorithm, wherein the second motor torque command signal for the first actuator is based on at least the second preliminary motor torque command signal for the first actuator and an output from the first Kalman filter; and
providing the second motor torque command signal for the first actuator to the first actuator, wherein the directional instrument is moved about the first axis of the gimbal in response to the second motor torque command signal for the first actuator.

16. The method of claim 15, further comprising:
generating a first rate command in the software executed by a processor, wherein the first motor torque command signal is based at least in part on the first position command and the first rate command.

17. The method of claim 16, wherein the first control algorithm further includes a first proportional rate control loop and a first proportional control position loop, wherein the proportional rate control loop includes a high pass filter implemented by the controller, the method further comprising:
after moving the directional instrument about the first axis of the gimbal in response to the first motor torque command signal, providing the first position measurement from the first position sensor as an input signal to the high pass filter of the first proportional rate control loop, and providing the first position measurement from the first position sensor as an input signal to the first proportional control position loop,
wherein the second motor torque command signal is generated based on an output from the first proportional rate control loop and an output from the first proportional control position loop.

18. The method of claim 17, wherein the processor is operated at a first rate, and wherein the controller is operated at a second rate that is faster than the first rate.

19. The method of claim 15, further comprising:
generating a first position command for a second actuator in the software executed by the processor included in the control electronics, wherein the second actuator is operable to move a second pivot assembly of the gimbal supporting the directional instrument about a second axis of the gimbal;
implementing at least portions of a second control algorithm in the controller of the motor control board included in the control electronics, wherein the second control algorithm includes at least a portion of a second linear Kalman filter disturbance estimator, and wherein a second Kalman filter included in the second linear Kalman filter disturbance estimator is implemented by the execution of the software by the processor;
providing the first position command for the second actuator from the processor included in the control electronics to the second control algorithm;
in response to the first position command for the second actuator generating a first preliminary motor torque command signal for the second actuator by the second control algorithm;
generating a first motor torque command signal for the second actuator by the second control algorithm, wherein the first motor torque command signal for the second actuator is based on the first preliminary motor torque command signal for the second actuator;
providing the first motor torque command signal for the second actuator to the second actuator, wherein the directional instrument is moved about the second axis of the gimbal in response to the first motor torque command signal for the second actuator;
providing the first motor torque command signal for the second actuator as a first input to the second Kalman filter and providing a first position measurement from a second position sensor associated with the second axis of the gimbal as a second input to the second Kalman filter, wherein the first position measurement from the second position sensor is taken after moving the directional instrument about the second axis of the gimbal in response to the first motor torque command signal for the second actuator;

providing a second position command for the second actuator from the processor included in the control electronics to the second control algorithm;

in response to the second position command, generating a second preliminary motor torque command signal for the second actuator by the second control algorithm;

generating a second motor torque command signal for the second actuator by the second control algorithm, wherein the second motor torque command signal for the second actuator is based on at least the second preliminary motor torque command signal for the second actuator and an output from the second Kalman filter; and providing the second motor torque command signal for the second actuator to the second actuator, wherein the directional instrument is moved about the second axis of the gimbal in response to the second motor torque command signal for the second actuator.

20. A system, comprising:
a main structure;
a control system mounted to the main structure, the control system, including:
   a computer, the computer including a processor; and
   a motor control board, the motor control board including a controller;
a gimbal, including:
   at least a first pivot assembly;
   a first actuator for the first pivot assembly; and
   a first position sensor for the first pivot assembly; and an antenna element,
wherein the antenna element is connected to the main structure by the gimbal,
wherein the first pivot assembly allows the antenna element to pivot relative to the main structure about a first axis,
wherein the controller implements a first control algorithm for control of the first actuator that produces a preliminary motor torque command signal for the first actuator,
wherein the first control algorithm generates a motor torque command signal that is based on the preliminary motor torque command signal for the first actuator and that is provided to the first actuator,
wherein the first control algorithm includes at least some portions of a first linear Kalman filter disturbance estimator,
wherein the processor executes software to implement a first linear Kalman filter that is included in the first linear Kalman filter disturbance estimator,
wherein the first linear Kalman filter receives the motor torque command signal that is provided to the first actuator as a first input to the first linear Kalman filter,
wherein the first linear Kalman filter receives a feedback signal from the first position sensor as a second input to the first linear Kalman filter, and
wherein an output of the first linear Kalman filter is applied to modify the preliminary motor torque command signal for the first actuator.

* * * * *